United States Patent [19]

Patterson

[11] Patent Number: 4,788,263
[45] Date of Patent: Nov. 29, 1988

[54] AROMATIC POLYCARBONATE RESIN BLENDS

[75] Inventor: Dwight J. Patterson, Evansville, Ind.

[73] Assignee: General Electric Company, Mt. Vernon, Ind.

[21] Appl. No.: 133,855

[22] Filed: Dec. 16, 1987

[51] Int. Cl.⁴ .............................................. C08F 283/02
[52] U.S. Cl. .................................. 525/463; 525/146; 525/523
[58] Field of Search ................ 525/463, 930, 523, 146

[56] References Cited

U.S. PATENT DOCUMENTS

| | | | |
|---|---|---|---|
| 3,480,695 | 11/1969 | Hale | 525/930 X |
| 4,605,731 | 8/1986 | Evans et al. | 528/371 |
| 4,607,079 | 8/1986 | Giles et al. | 525/65 |
| 4,644,053 | 2/1987 | Brunelle et al. | 528/371 |

Primary Examiner—Theodore E. Pertilla
Attorney, Agent, or Firm—Martin B. Barancik

[57] ABSTRACT

An aromatic polycarbonate resin blend characterized by improved melt-flow properties particularly suited for blow molding. The blend consists of at least 80 percent of cyclic polycarbonate oilgomer or polycarbonate molding resin, the remainder being an aromatic hydroxylated resin such as a phenoxy resin, together with a curing agent.

15 Claims, 1 Drawing Sheet

AROMATIC POLYCARBONATE RESIN BLENDS

This invention is concerned with a novel resin composition having improved melt strength properties. It is more particularly concerned with a resin composition comprising a major fraction of aromatic polycarbonate resin which is particularly suited for blow molding large objects.

BACKGROUND OF THE INVENTION

Polycarbonate polymers are highly regarded engineering resins because of their excellent physical properties. For example, aromatic polycarbonates formed from dihydric phenols exhibit high tensile and impact strength as well as very good thermal stability.

Blow molding is a well known process for making hollow objects. In general, the process consists of extruding a molten tube of resin from a die to an open mold, which is then closed around the tube (parison), the bottom of tube having been pinched together by the mold. Air and pressure is fed through the die into the tube which expands to fill the mold, and the part is cooled as it is held under internal air pressure. The cooled part falls free on opening the mold.

It is generally recognized that a resin for use in blow molding should have certain consistent processing properties. In particular, the parison melt should be resistant to sag. If a large object is to be made, the molding equipment can be provided with a cylinder and a piston as an accumulator for the melt. The melt from the extruder is fed to the accumulator, from which it is emptied at a much faster rate to form a large parison, thereby minimizing sag of the molten tube. Ideally, to reduce sag the molten resin should show a strong dependence on shear rate of the tactoscopic variety, i.e., it should exhibit increasing viscosity as shear rate decreases, and this property should manifest itself at low shear rates. Resistance to sag of the material between the die and the rollers is also of some importance in extruding sheet stock.

It is an object of this invention to provide a polycarbonate resin blend having improved rheological properties for blow molding.

It is a further object of this invention to provide a resin blend in which the desirable physical properties of the aromatic polycarbonate resin is preserved.

It is a still further object of this invention to provide an improved process for blow molding polycarbonate resins.

These and other objects will become evident to one skilled in the art on reading this entire specification including the appended claims.

BRIEF SUMMARY OF THE INVENTION

Figure 1:
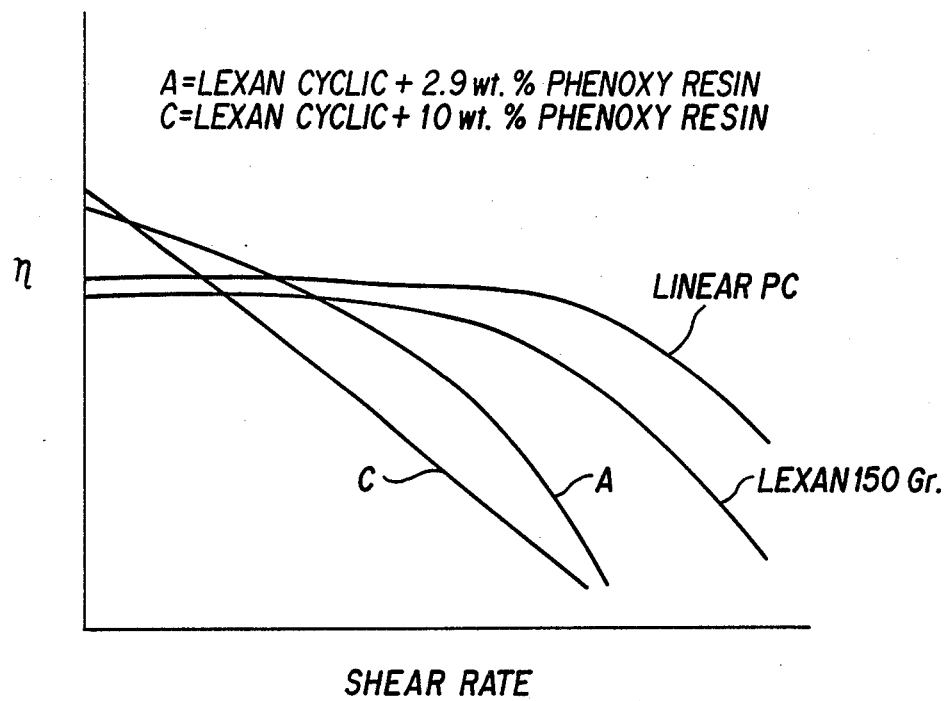
FIG. 1 of the drawing describes the viscosity vs shear rate behavior of conventional polycarbonate resins and blends of this invention.

It has now been found that the rheological properties of aromatic carbonate polymers such as those based on bisphenol-A are unexpectedly altered by blending the polymer with a small amount of a thermoplastic hydroxylated resin prepared, for example, by the condensation of bisphenol-A with epichlorhydrin, and curing the blend with an effective amount of an anionic curing agent, all as more fully described below. The cured blend, unlike the polycarbonate alone, exhibits a strong dependence of viscosity on shear rate, with the material becoming more viscous as the shear rate approaches zero. Additionally, the compositions of this invention can have higher viscosities at zero shear than the carbonate polymer alone. Each of these properties are those required to reduce sag in blow molding and sheet extrusion.

It is a feature of this invention that the curing step is rapid at elevated temperature, allowing this step to be conducted either in the extruder itself or before loading the blend and curing agent into the hopper.

DETAILED DESCRIPTION AND BEST MODE

Either cyclic aromatic polycarbonate oligomers or the more conventional aromatic polycarbonate molding resins may be used to prepare the reactive molding resin blends of this invention. Both types of polymer are known and need not be described here in great detail.

The cyclic oligomers for use in the method of this invention are those described by Formula I,

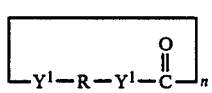
(I)

wherein each R is independently a divalent aliphatic, alicyclic or aromatic radical, and each $Y^1$ is independently oxygen or sulfur, but preferably oxygen, and wherein n is variously 2 to 30. The preparation of such oligomers is described in U.S. Pat. No. 4,644,053 to Brunelle et al., incorporated herein by reference.

Preferably at least about 60% and more preferably at least about 80% of the total number of R values in the cyclic oligomer mixtures, and most desirably all of said R values, are aromatic. The aromatic R radicals preferably have the formula $$-A^1-Y^2-A^2-, \qquad (II)$$

wherein each of $A^1$ and $A^2$ is a single-ring divalent aromatic radical and $Y^2$ is a bridging radical in which one or two atoms separate $A^1$ from $A^2$. The free valence bonds in Formula II are usually in the meta or para positions of $A^1$ and $A^2$ in relation to $Y^2$. Such R values may be considered as being derived from bisphenols of the formula $HO-A^1-Y^2-A^2-OH$. Frequent reference to bisphenols will be made hereinafter, but it should be understood that R values derived from suitable compounds other than bisphenols may be employed as appropriate.

The cyclic oligomer mixtures may be prepared by a condensation reaction involving at least one compound selected from the group consisting of bishaloformates and thiol analogs thereof, said compounds having the formula:

$$R(Y^1COX)_2 \qquad (III)$$

wherein R and $Y^1$ are as defined hereinabove and X is chlorine or bromine. The condensation reaction typically takes place interfacially when a solution of said compound in a substantially non-polar organic liquid is contacted with a tertiary amine from a specific class and an aqueous alkali metal hydroxide solution. The condensation reaction may be conducted either with at least one compound having the structure of Formula IV, or with a mixture thereof with at least one bis(active hydrogen) compound having the formula:

 (IV)

wherein R and $Y^1$ are as defined herein above. For convenience, the haloformate of Formula III will often be referred to herein below as "Reagent A-1, and the bis(active hydrogen) compound of Formula IV as "Reagent A-2". The Condensation is effected under conditions resulting in high dilution of Reagent A, or the equivalent thereof, in a substantially non-polar organic liquid which forms a two-phase system with water, and with subsequent separation of the resulting cyclic oligomer mixture from at least a portion of the high polymer and insoluble material present.

Reagent-A, a composition comprising compounds of Formula III (Reagent A-1) and, optionally, compounds of Formula IV (Reagent A-2). It may also contain other compounds, including oligomers of the formula:

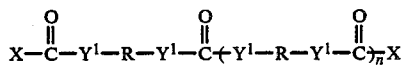

wherein R, $Y^1$ and X are as previously defined and n is a small number, typically about 1-4.

While the X values in Formula IV (Reagent A-1) may be chlorine or bromine, the bischloroformates, in which X is chlorine, are most readily available and their use is therefore preferred. (Frequent reference to bischloroformates will be made hereinafter, but it should be understood that other bishaloformates may be substituted therefor as appropriate.) Suitable bis(active hydrogen) compounds of Formula V (Reagent A-2) include diols and thiol analogs thereof having divalent radicals of Formula Ia which are different from the corresponding divalent radicals in the compound of Formula IV, as well as other dihydroxyaromatic compounds and thiol analogs thereof. When such bis(active hydrogen) compounds are present, they generally comprise up to about 50%, most often up to about 20% and preferably up to about 10% of Reagent A. Most preferably, however, reagent A consists essentially of Reagent A-1. Any cyclic oligomers containing divalent aliphatic radicals (or their vinylogs) flanked by two oxygen atoms are prepared by using a mixture of compounds identifiable as Reagent A-1.

The bischloroformate may be employed in substantially pure, isolated form. It is frequently preferred, however, to use a crude bischloroformate product. Suitable crude products may be prepared by any known methods for bischloroformate preparation. Typically, at least one bisphenol is reacted with phosgene in the presence of a substantially inert organic liquid, as disclosed in the the following U.S. patents:

U.S. Pat. No. 3,255,230
U.S. Pat. No. 3,966,785
U.S. Pat. No. 3,312,661
U.S. Pat. No. 3,974,126.

The disclosures of these patents are incorporated by reference herein. In addition to the bisphenol bischloroformate, such crude bischloroformate products may contain oligomer bischloroformates containing up to 3 bisphenol units. They may also contain minor amounts of higher oligomer bischloroformates and of monochloroformates corresponding to any of the aforementioned bischloroformates. Higher oligomer mono-and bischloroformates are preferably present, if at all, only in trace amounts.

More preferably, the preparation of the crude bischloroformate product takes place in the presence of aqueous alkali. The pH of the reaction mixture may be up to about 12. It is generally found, however, that the proportion of high polymer in the cyclic oligomer mixture is minimized by employing a crude bischloroformate product comprising a major amount of bisphenol bischloroformate and only minor amounts of any oligomer bischloroformates. Such products may be obtained by the method disclosed in copending, commonly assigned application Ser. No. 676,353, filed Nov. 29, 1984, now abandoned, the disclosure of which is also incorporated by reference herein. In that method, phosgene is passed into a mixture of a substantially inert organic liquid and a bisphenol, said mixture being maintained at a temperature within the range of about 10°–40° C., the phosgene flow rate being at least 0.15 equivalent per equivalent of bisphenol per minute when the temperature is above 30° C. An aqueous alkali metal or alkaline earth metal base solution is simultaneously introduced as necessary to maintain the pH in the range of 0-8. By this method, it is possible to prepare bischloroformate in high yield while using a relatively small proportion of phosgene, typically up to about 1.1 equivalent per equivalent of bisphenol.

When one of these methods is employed, it is obvious that the crude bischloroformate product will ordinarily be obtained as a solution in a substantially non-polar organic liquid such as those disclosed hereinafter. Depending on the method of preparation, it may be desirable to wash said solution with a dilute aqueous acidic solution to remove traces of base used in preparation.

The tertiary amines useful as Reagent B ("tertiary" in this context denoting the absence of N—H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. No. 4,217,438 and in U.S. Pat. No. 4,368,315, the disclosure of which is also incorporated by reference herein. They include aliphatic amines such as triethylamine, tri-n-propylamine, diethyl-n-propylamine and tri-n-butylamine and highly nucleophilic hererocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and Reagent A is essential for the formation of the cyclic oligomer mixture. For the most part such amines contain at least about 6 and preferably about 6-14 carbon atoms.

The amines most useful as Reagent B are trialkylamines containing no branching on the carbon atoms in the 1- and 2- positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Reagent C is an aqueous alkali metal hydroxide solution. It is most often lithium, sodium or potassium hydroxide, with sodium hydroxide being preferred because of its availability and relatively low cost. The concentration of said solution is about 0.2–10M and preferably no higher than about 3M.

The fourth essential component in the cyclic oligomer prepartion method of this invention is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, in step I the reagents and components are maintained in contact under conditions wherein Reagent A is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method Reagent A or Reagents A and B are added gradually to a mixture of the other materials. It is within the scope of this embodiment to incorporate Reagent B in the mixture to which Reagent A is added, or to add it gradually, either in admixture with Reagent A or separately. Continuous or incremental addition of Reagent B is frequently preferred, whereupon the cyclic oligomer mixture is obtained in relatively pure form and in high yield.

Although addition of Reagent A neat (i.e., without solvents) is within the scope of this embodiment, it is frequently inconvenient because many bischloroformates are solids. Therefore, it is preferably added as a solution in a portion of the organic liquid, especially when it consists essentially of Reagent A-1. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to high polymer and insoluble and/or intractable by-products, it is preferred to use not more than about 0.7 mole of Reagent A (calculated as bisphenol bischloroformate) per liter of organic liquid present in the reaction system, including any liquid used to dissolve Reagent A. Preferably, about 0.003–0.6 mole of Reagent A is used when it consists entirely of Reagent A-1, and no more than about 0.5 mole is used when it is a mixture of Reagents A-1 and A-2. It should be noted that this is not a molar concentration in the organic liquid when Reagent A is added gradually, since said reagent is consumed as it is added to the reaction system.

The molar proportions of the reagents constitute another important feature for yield and purity maximization. The preferred molar ratio of Reagent B to Reagent A (calculated as bisphenol bischloroformate) is about 0.1–1.0:1 and most often about 0.2–0.6:1. The preferred molar ratio of Reagent C to Reagent A is about 1.5–3:1 and most often about 2–3:1.

Step II of the cyclic oligomer preparation method is the separation of the oligomer mixture from at least a portion of the high polymer and insoluble material present. When other reagents are added to Reagent C and the preferred conditions and material proportions are otherwise employed, the resulting solution of cyclic oligomer mixture typically contains less than 30% by weight and frequently less than about 20% of high polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using as Reagent B at least one aliphatic or heterocyclic tertiary amine which, under the reaction conditions, dissolves preferentially in the organic phase of the reaction system, and gradually adding Reagents A, B and C simultaneously to a substantially non-polar organic liquid or a mixture of said liquid with water, said liquid or mixture being maintained at a temperature in the range of about 0°–50° C.; the amount of Reagent A used being up to about 0.7 mole for each liter of said organic liquid present in the reaction system, and the molar proportions of Reagents A, B and C being approximately as follows:

B:A-0.2-1.0:1
C:A-2-3:1;

and recovering the cyclic oligomers thus formed.

As in the embodiment previously described, another portion of said liquid may serv as a solvent for Reagent A. Addition of each reagent is preferably continuous, but may be incremental for any or all of said reagents.

Among the principal advantages of this preferred embodiment are the non-criticality of the degree of dilution of the reagents and the ability to complete the addition and reaction in a relatively short time, regardless of reaction scale. It ordinarily takes only about 25–30 minutes to complete cyclic oligomer preparation by this method, and the cyclic oligomer yield may be 85–90% or more. The crude product usually also contains only minor amounts of high molecular weight linear polycarbonates as by-products. By contrast, use of a less preferred embodiment may, depending on reaction scale, require an addition period as long as 8–10 hours and the crude product may contain substantial proportions of linear by-products with molecular weights of about 4,000–10,000, which, if not removed, may interfere with subsequent use of the cyclic oligomers.

It is believed that the advantageous results obtained by employing the preferred embodiment are a result of the relatively low pH of the reaction mixture, typically about 9–10. When Reagent A (and optionally Reagent B) is added to Reagent C, on the other hand, the initial pH is on the order of 14.

When step II is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and optionally, from high polymer and other impurities.

The more conventional polycarbonate molding resins useful in the present invention can be prepared by reacting a dihydric phenol with a carbonate precursor, such as phosgene, a haloformate or a carbonate ester. Generally speaking, such carbonate polymers possess recurring structural units of the formula:

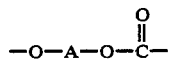 (V)

wherein A is a divalent aromatic radical of the dihydric phenol employed in the polymer producing reaction. Preferably, the conventional carbonate molding resins used to provide the resinous mixtures of the invention have an intrinsic viscosity (as measured in methylene chloride at 25° C.) ranging from about 0.30 to about 1.7 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis(4-hydroxyphenyl)propane;
hydroquinone;
resorcinol;
2,2-bis-(4-hydroxyphenyl)pentane;
2,4′-dihydroxydiphenylmethane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4′-dihydroxydiphenyl sulfone;
5′-chloro-2,4′-dihydroxydiphenyl sulfone;
bis-(4-hydroxyphenyl)diphenyl sulfone;
4,4′-dihydroxydiphenyl ether;
4,4′-dihydroxy-3,3′-dichlorodiphenyl ether;
4,4′-dihydroxy-2,5-dimethyldiphenyl ether; and the like.

Other dihydric phenols which are also suitable for use in the preparation of the above polycarbonates are disclosed in U.S. Pat. Nos. 2,999,835; 3,028,365; 3,334,154; and 4,131,575.

The aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy or acid terminated polyester or with a dibasic acid in the event a modified carbonate copolymer or interpolymer rather than a homopolymer is desired for use in the preparation of the modified polycarbonate of this invention. Branched polycarbonates such as are described in U.S. Pat. No. 4,001,184, also may be modified by the method of this invention. In any event, the preferred aromatic polycarbonate resin for use in this invention is a homopolymer derived from 2,2-bis(4-hydroxyphenyl)propane (bisphenol-A). Such resins are commercially available from General Electric Company as LEXAN ® resins.

The phenoxy resins utilized herein are high molecular weight thermoplastic resins which are produced from 2,2-bis(4-hydroxyphenyl) propane and epichlorohydrin according to the procedure as described in U.S. Pat. No. 3,356,646 issued Dec. 5, 1967. The basic chemical structure of the phenoxy resins is similar to that of epoxy resins. They are, however, a separate and unique class, differing from epoxies in several important characteristics. Unlike the epoxies which have a molecular weight of 340 to 13,000 and cross-link on polymerization with catalyst, the phenoxy resins are thermoplastic polymers with average molecular weight ranging from about 20,000 to 50,000 or more and have no terminal reactive epoxy groups.

The phenoxy resins useful in this invention can be characterized by a repeating structure:

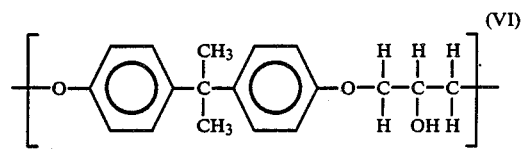 (VI)

and having an average molecular weight range from about 5,000 to 75,000. As is obvious, the terminal structure is completed with hydrogen atoms or suitable end capping groups. Phenoxy resins are commercially available from Union Carbide Corporation as UCAR Phenoxy Resins, grade PKHC, PKHH, PKHJ and PKHM.

It is contemplated that other thermoplastic polyhydroxylated resins such as poly(p-hydroxystyrene), and reaction products of butadiene dioxide with bisphenol-A or other dihydric phenols such as are described in U.S. Pat. No. 3,405,199, also may be used for preparing the blends of this invention.

The blend of polycarbonate resin with phenoxy resin for purposes of this invention is prepared by adding to each 100 parts by weight of polycarbonate molding resin about 0.5 to 25 parts, preferably 1.0 to 15 parts, of thermoplastic hydroxylated resin. These proportions remain the same regardless of whether the polycarbonate molding resin is furnished by cyclic oligomer or by conventional polycarbonate molding resin. A phenoxy resin is preferred as the thermoplastic hydroxylated resin since it is readily available and highly effective.

The resin blends of this invention require inclusion of a curing agent to achieve optimal melt flow properties. The term "curing" as used herein means modification of the properties of the blend to provide desirable melt flow properties as well as desirable physical properties for molded objects when the blend is heated to a temperature above about 150° C. in contact with the curing agent described hereinbelow. All of the functions of the curing agent are not well understood, but an essential one is to polymerize the cyclic oligomers to high molecular weight polycarbonate when the cyclic oligomers provide part or all of the polycarbonate component of the blend. In any case, it is believed that curing promotes an advantageous interaction between the polycarbonate component and the thermoplastic hydroxylated resin.

The curing agent (hereinbelow referred to as catalyst) will now be described with particular reference to its use with blends containing cyclic oligomer. According to the present invention, conversion of the abovedescribed cyclic oligomers to high molecular weight polycarbonate is effected by contact with a polycarbonate formation catalyst which generates aryl carbanions. Such materials, described more fully hereinunder, will sometimes be referred to as "anionic polymerization catalyst", since they posess that capability. The use of the term, however, is not to be construed in a mechanistic sense, but rather as a description of the material or materials. Said carbanions are very strong nucleophiles. While the present invention is not dependent on any theory or reaction mechanism, it is believed that said carbanions undergo an addition reaction with the electrophilic carbonate carbon atoms in accordance with Equation (A), wherein R and $Y^1$ are as defined in Formula I, n is the number of structural units in the oligomer molecule and $X^{2-}$ is the carbanion. The product of this step is a highly reactive linear oxy anion which in turn undergoes an addition reaction with further carbonate moieties, forming "living" linear polycarbonate species.

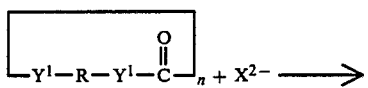

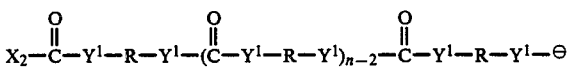

Eq. (A)

A preferred method for generating aryl carbanions is by the dissociation of a coordination compound containing a polyaryl-substituted anion. A highly preferred class of coordination compounds of this type is represented by Formula VII, wherein M is one equivalent of a cation other than hydrogen and Z is an aromatic radical or two Z values taken together form a divalent aromatic radical.

$$M^+BZ_4 \qquad\qquad \text{VII}$$

The M value may be any metal cation, with alkali metals, especially lithium, sodium and potassium being preferred. More desirably however, it has Formula VIII, $$(R^2)_4Q^\oplus \qquad\qquad \text{VIII}$$

wherein each $R^2$ is independently a $C_{1-4}$ primary alkyl or $C_{6-10}$ aryl radical, preferably alkyl and most desirably methyl, and Q is nitrogen, phosphorus or arsenic.

The Z values in Formula VII may be phenyl radicals or substituted phenyl radicals wherein the substituents may be $C_{1-4}$ alkyl, aryl, halo, nitro, $C_{1-4}$ alkoxy or the like. Any substituents are preferably electron-withdrawing groups such as halo or nitro, but unsubstituted phenyl radicals are most preferred. It is also possible for two Z values together to form a divalent radical such as 2,2-biphenylene. When Z is monovalent (e.g., phenyl), its structure is identical to that of $X^2$; when Z is divalent (e.g. 2,2'-biphenylene), $X^2$ may have a structure of the type represented by Formula IX.

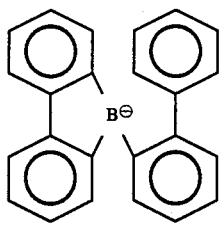

(IX)

Thus, it will be apparent to those skilled in the art that suitable catalytic species include such compounds as lithium tetraphenylborate, sodium tetraphenylborate, sodium bis(2,2'-biphenylene)borate, postassium tetraphenylborate, tetramethylammonium tetraphenylborate tetra-n-butylammonium tetraphenylborate, tetramethylphosphonium tetraphenylborate, tetra-n-butylphosphonium tetraphenylborate and tetraphenylphosphonium tetraphenylborate. As between these and similar catalysts, the choice may be dictated by such factors as the desired rate of reaction and the chemical nature of the oligomer composition being polymerized. For the preparation of aromatic polycarbonates such as bisphenol A polycarbonate, the preferred catalysts are the tetra-n-alklammonium and tetra-n-alkylphosphonium tetraphenylborates. Tetramethylammonium tetraphenylborate is particularly preferred because of its high activity as a catalyst and endcapping agent (as described hereinafter), relatively low cost and ease of preparation from tetramethylammonium hydroxide and an alkali metal tetraphenylborate.

The polymerization and curing is typically effected by merely contacting the blended cyclic oligomer mixture with the catalyst at temperatures up to 350° C., preferably about 200°-300° C., until polymerization has proceeded to the extent desired. Although a solvent may be used, it is not necessary and is frequently not preferred.

The required temperature is dependent to some extent on the identity of the catalyst. One reason for the preference for quaternary ammonium and phosphonium tetraphenylborates is that they are extremely active at temperatures as low as 200° C., effecting essentially 100% conversion to catalyst in about 10-30 minutes. Sodium tetraphenylborate, on the other hand, is essentially ineffective as a catalyst at 200° C. but is effective at 250° C.

Another reason the quaternary catalysts are often preferred is their capability of serving as endcapping agents for the growing polycarbonate chains. The cations in such compounds decompose in the presence of "living" anionic polymer species of Equation (A), yielding tertiary amines or phosphines and substantially unreactive polymer end groups. With methyl or phenyl substituents, methoxy or phenoxy end groups are produced; with higher alkyl substituents, a mixture of alkoxy and hydroxy end groups and olefinic by-products. This decomposition is slow enough under polymerization conditions to permit complete conversion to polymer before it takes place.

The proportion of catalyst used in the blends of this invention will depend to some extent on the molecular weight of the polymer desired when cyclic oligomer is used, and the time available for completion of the polymerization and curing. Higher proportions decrease polymerization and curing time.

It is generally found that catalyst proportions of about 0.001-0.5 mole percent, based on carbonate units in the oligomer or polycarbonate molding resin component, is satisfactory. In the case of bisphenol A polycarbonate oligomer mixture and tetramethylammonium tetraphenylborate, the polymerization reaction is complete in less than 5 minutes at 0.05 mole percent catalys and in approximately 60 minutes at 0.0013 mole percent.

U.S. Pat. Pat. No. 4,605,731 to Evans et al. is incorporated herein by reference for additional description of the anionic polymerization catalyst.

Blending the polycarbonate, the thermoplastic hydroxylated polymer and the curing agent can be done by any of the methods commonly used for the purpose, such as dry blending, blending in extruders, heated rolls or other types of mixers. For the purpose of preparing uncured blends to be later cured in an extruder, dry blending of pellets together with curing agent, such as by tumbling, may be used. Master-batching of curing agent with the cyclic oligomer (as shown in Example 1) is satisfactory for preparing uncured as well as cured blends. For prepartion of cured blends, the three components are subject to intensive mixing at a curing temperature from about 150° C. up to about 300° C.

Common additives for thermoplastic resins may be included in the blend. For example, stabilizers such as epoxides may be employed as well as agents which are flame retardants, ductility enhancers, antioxidants, solvent resistance enhancers, ultraviolet light stabilizers, colorants and various inert fillers. Impact modifiers may also be present in the composition.

EXAMPLES

The examples which follow are given for illustrative purposes and are not intended to limit the scope of this invention, which scope is determined by this entire specification including the appended claims. All parts and proportions are by weight unless explicitly stated to be otherwise.

EXAMPLE 1

A master-batch preblend of LEXAN® cyclic bisphenol-A polycarbonate having a weight-average molecular weight of about 1300 and tetrabutylammonium tetraphenyl borate anionic catalyst was prepared as follows. A 2-liter round bottom flask was charged with 265 grams of the carbonate polymer, 0.5907 grams of anionic catalyst, and 500 ml of dichloromethane. The flask was put on a shaker for 15 minutes to dissolve the soluble solids, and an additional 100 ml of methylene dichloride was added. The solution was then filtered to remove insoluble matter, returned to the 2-liter flask, and the solvent evaporated under vacuum in a Rotobath provided with warm water. After removal of about 90% of the methylene dichloride, the solid was broken up with a spatula and the remainder of the solvent removed. The final product weighed 265.84 grams, and contained 0.1 mole percent of catalyst.

49.40 grams of the above preblend of cyclic polycarbonate polymer that contained 0.1 mole % tetrabutyl ammonium tetraphenyl borate initiator and 5.12 grams of UCAR phenoxy resin, PKHH grade, were weighed in an aluminum pan and placed in a vacuum oven at 100° C. for about 18 hours.

The mixture was then loaded into a Haaka blender fitted with counter-rotating rollers and a torque meter. (The Haaka blender is marketed by the Haaka Buchler Instrument Corp., Bound Brook, N.J.). The mixture was then blended for 20 minutes with the temperature set at 290° C. The recovered resin was amber in color and only partially soluble in methylene dichloride, indicating some gel formation (i.e., crosslinking).

EXAMPLE 2

50.31 grams of the preblend of Example 1 and 1.48 grams of the same UCAR phenoxy resin, PKHH grade, as used in Example 1 were placed in a jar and tumbled on rollers for 15 minutes. The sample was then dried in a vacuum oven at 100° C. for about 2½ hours. The blend contained 2.86 wt % of the phenoxy resin.

The mixture was then loaded into the Haaka blender preset at 32 RPM (revolutions per minute) and at 290° C. The loading took about 1.5 minutes, during which time the solid particles melted and coated the rolls.

Torque readings were made at intervals after loading. The results were as follows (note: the "elapsed time" shown in this and in subsequent examples includes 1.5 minutes for loading).

| Elapsed Time (min) | Torque, gm-cm |
| --- | --- |
| 1.5 | 3200 |
| 5.5 | 3800 |
| 7.5 | 3000 |
| 9.5 | 2400 (stopped). |

The cured blend was removed from the rolls and stored in a capped jar. This cured blend will be designated "Blend A" hereinunder.

The foregoing example illustrates the rapid curing of the blend at about 290° C., evidenced by rise and subsequent fall of the observed torque values.

EXAMPLE 3

A mixture similar to that of Example 2 but containing 5.54 wt % of the phenoxy resin was prepared and cured in the same manner as in Example 2.

| Elapsed Time (min) | Torque, gm-cm |
| --- | --- |
| 1.5 | 1000 |
| 2.5 | 4000 |
| 3.5 | 4100 |
| 5.5 | 2700 |
| 6.5 | 2400 (stopped). |

EXAMPLE 4

A mixture similar to that of Example 2 but containing 10.24 wt % of phenoxy resin was prepared and cured in the same manner as in Example 2. This blend will be designated "Blend C" hereinunder.

| Elapsed Time (min) | Torque, gm-cm |
| --- | --- |
| 1.5 | 1700 |
| 2.5 | 3500 |
| 4.5 | 2800 |
| 5.5 | 2300 |
| 6.5 | 2000 (stopped). |

EXAMPLE 5

Cured Blend A retained from Example 2 was examined for its viscosity-shear rate dependence by the use of a Rheometrics Dynamic Spectrometer, RDS 7700, manufactured by Rheometrics, Piscataway, N.J. The test was made at a sample temperature of 300° C. The curve generated is reproduced in FIG. 1 of the drawing and labelled "A". The same procedure was followed with retained Blend C and is shown in FIG. 1, labelled "C".

For comparison, samples of conventional LEXAN 150 grade and LEXAN grade polycarbonate resins manufactured by General Electric Company were also evaluated and shown in FIG. 1.

FIG. 1 clearly demonstrates the large, advantageous change of rheology produced by the cured blends of this invention.

What is claimed is:

1. A method for preparing an aromatic polycarbonate resin blend having improved flow properties for blow molding, said method comprising:

blending (by weight) with each 100 parts of a cyclic polycarbonate oligomer or a polycarbonate molding resin about 0.5 to 25 parts of a thermoplastic hydroxyplated resin with an average molecular weight range of about 15,000 to 75,000 and an amount of anionic polymerization catalyst effective to cure said blend when heated to a temperature above 150° C.; and, curing said blend at a temperature of 150° C. to about 300° C.

2. The method of claim 1 wherein said anionic polymerization catalyst is tetramethylammonium tetraphenylborate or tetrabutylammonium tetraphenylborate and said amount is 0.001 to 0.5 mole percent of said carbonate units in said blend.

3. The method of claim 1 wherein the cyclic polycarbonate oligomer or polycarbonate molding resin is a polycarbonate of bisphenol-A, wherein said hydroxylated resin is a phenoxy resin, and wherein said curing step is conducted in the barrel of the extruder.

4. The method of claim 3 wherein said anionic polymerization catalyst is tetramethylammonium tetraphenylborate or tetrabutylammonium tetraphenylborate and said amount is 0.001 to 0.5 mole percent of said carbonate units in said blend.

5. A curable thermoplastic molding resin composition comprising an aromatic polycarbonate polymer and from about 0.5 to 25 parts by weight of a thermoplastic hydroxylated resin with an average molecular weight range of about 15,000 to 75,000 for each 100 parts of said polycarbonate polymer and an amount of anionic polymerization catalyst effective to cure said blend when heated to a temperature above 150° C.

6. The composition of claim 5 wherein said aromatic polycarbonate polymer comprises cyclic oligomers of bisphenol-A polycarbonate and said hydroxylated resin is a phenoxy resin.

7. The composition of claim 6 including an anionic polymerization catalyst in an amount effective to induce curing of said blend at elevated temperature.

8. The composition described in claim 7 wherein said anionic polymerization catalyst is tetramethylammonium tetraphenylborate or tetrabutylammonium tetraphenylborate and said amount is 0.001 to 0.5 mole percent of said carbonate units in said blend.

9. The composition of claim 5 wherein said aromatic polycarbonate is a bisphenol-A polycarbonate molding resin and said hydroxylated resin is a phenoxy resin.

10. The composition of claim 9 including an anionic polymerization catalyst in an amount effective to induce curing of said blend at elevated temperature.

11. The composition of claim 5 containing about 1.0 to about 10 parts by weight of said thermoplastic hydroxylated resin for each 100 parts of said polycarbonate polymer.

12. The cured composition described in claim 7.

13. The cured composition described in claim 10.

14. The cured composition described in claim 11.

15. A composition comprising
(1) an aromatic polycarbonate polymer or cyclic polycarbonate oligomer admixed with
(2) from about 0.5 to 25 weight percent of a thermoplastic hydroxylated resin which is a phenoxy; and
(3) an anionic polymerization catalyst in an amount effective to induce curing of the composition at a temperature above 150° C.

* * * * *

UNITED STATES PATENT AND TRADEMARK OFFICE
CERTIFICATE OF CORRECTION

PATENT NO. : 4,788,263

DATED : November 29, 1988

INVENTOR(S) : Dwight Juan Patterson

It is certified that error appears in the above-identified patent and that said Letters Patent is hereby corrected as shown below:

Col. 8
Line 28
"5,000" should read "15,000"

Col. 9
Line 43
"$M+BZ_4$" should read "$M+BZ_4^{\ominus}$"

Col. 11
Line 7
"catalys" should read "catalyst"

Col. 13
Line 24
"hydroxyplated" should read "hydroxylated"

Signed and Sealed this

Thirty-first Day of July, 1990

Attest:

HARRY F. MANBECK, JR.

Attesting Officer     Commissioner of Patents and Trademarks